(12) United States Patent
Lee et al.

(10) Patent No.: US 11,177,517 B2
(45) Date of Patent: Nov. 16, 2021

(54) AIR-COOLING BATTERY PACK HAVING IMPROVED ASSEMBLING STRUCTURE

(71) Applicant: LG CHEM, LTD., Seoul (KR)

(72) Inventors: Jung-Hoon Lee, Daejeon (KR);
Eun-Gyu Shin, Daejeon (KR);
Byoung-Cheon Jeong, Daejeon (KR);
Dal-Mo Kang, Daejeon (KR); Jeong-O Mun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 153 days.

(21) Appl. No.: 16/303,252

(22) PCT Filed: Dec. 6, 2017

(86) PCT No.: PCT/KR2017/014254
§ 371 (c)(1),
(2) Date: Nov. 20, 2018

(87) PCT Pub. No.: WO2018/110896
PCT Pub. Date: Jun. 21, 2018

(65) Prior Publication Data
US 2019/0207277 A1  Jul. 4, 2019

(30) Foreign Application Priority Data
Dec. 14, 2016  (KR) .......... 10-2016-0170653

(51) Int. Cl.
*H01M 10/613*  (2014.01)
*H01M 10/647*  (2014.01)
(Continued)

(52) U.S. Cl.
CPC ......... *H01M 10/613* (2015.04); *H01M 10/42* (2013.01); *H01M 10/425* (2013.01);
(Continued)

(58) Field of Classification Search
CPC .. H01M 50/20; H01M 50/209; H01M 10/613; H01M 10/42; H01M 10/425;
(Continued)

(56) References Cited

U.S. PATENT DOCUMENTS

2007/0264562 A1*  11/2007  Kang ............... H01M 2/105
429/96
2011/0052960 A1*  3/2011  Kwon ............... H01M 10/613
429/120
(Continued)

FOREIGN PATENT DOCUMENTS

CN  103797610 A  5/2014
CN  102005599 B  6/2014
(Continued)

OTHER PUBLICATIONS

International Search Report (with partial translation) and Written Opinion dated Apr. 16, 2018, issued in corresponding International Patent Application No. PCT/KR2017/014254.
(Continued)

*Primary Examiner* — Karie O'Neill Apicella
(74) *Attorney, Agent, or Firm* — Morgan, Lewis & Bockius LLP

(57) ABSTRACT

Disclosed is an air-cooling battery pack, which includes a cell assembly having a plurality of cells stacked therein; an air duct disposed to contact the cell assembly and having an air passage formed therein to allow a cooling air to move therethrough; a coupling groove formed at the air duct to elongate in a longitudinal direction; and a battery management system (BMS) plate having a BMS for managing the cells and assembled to the air duct by a slider slidably inserted into the coupling groove.

16 Claims, 4 Drawing Sheets

(51) Int. Cl.
*H01M 10/6565* (2014.01)
*H01M 10/42* (2006.01)
*H01M 50/20* (2021.01)
*H01M 50/209* (2021.01)
*H01M 10/6557* (2014.01)
*H01M 10/6562* (2014.01)
*H01M 10/6556* (2014.01)
*H01M 10/6561* (2014.01)

(52) U.S. Cl.
CPC ..... *H01M 10/647* (2015.04); *H01M 10/6556* (2015.04); *H01M 10/6557* (2015.04); *H01M 10/6561* (2015.04); *H01M 10/6562* (2015.04); *H01M 10/6565* (2015.04); *H01M 50/20* (2021.01); *H01M 50/209* (2021.01); *H01M 2010/4271* (2013.01)

(58) Field of Classification Search
CPC .......... H01M 10/647; H01M 10/6557; H01M 10/6565; H01M 10/6562
See application file for complete search history.

(56) References Cited

U.S. PATENT DOCUMENTS

| | | | | |
|---|---|---|---|---|
| 2011/0155485 A1* | 6/2011 | Tsurumi | ............. | H01M 10/425 180/65.1 |
| 2013/0323551 A1 | 12/2013 | Lee et al. | | |
| 2014/0162165 A1 | 6/2014 | Song et al. | | |
| 2014/0178721 A1 | 6/2014 | Chung et al. | | |
| 2014/0363710 A1 | 12/2014 | Lee et al. | | |
| 2015/0140380 A1 | 5/2015 | Kang et al. | | |
| 2015/0144409 A1* | 5/2015 | Fujii | ................... | H01M 2/1077 180/65.1 |
| 2015/0295283 A1 | 10/2015 | Eom et al. | | |
| 2016/0093861 A1 | 3/2016 | Rockford | | |
| 2016/0233465 A1 | 8/2016 | Lee et al. | | |
| 2016/0233479 A1 | 8/2016 | Ahn et al. | | |

FOREIGN PATENT DOCUMENTS

| | | |
|---|---|---|
| CN | 203631621 U | 6/2014 |
| CN | 105322215 A | 2/2016 |
| CN | 105633501 A | 6/2016 |
| CN | 205609703 U | 9/2016 |
| CN | 205621775 U | 10/2016 |
| EP | 2 290 731 B1 | 3/2011 |
| JP | 2011-23301 A | 2/2011 |
| KR | 10-1256296 B1 | 4/2013 |
| KR | 10-2013-0061895 A | 6/2013 |
| KR | 10-1355961 B1 | 2/2014 |
| KR | 10-2015-0044800 A | 4/2015 |
| KR | 10-2015-0049277 A | 5/2015 |
| KR | 10-2016-0028205 A | 3/2016 |
| KR | 10-1650027 B1 | 8/2016 |
| KR | 10-2016-0139807 A | 12/2016 |

OTHER PUBLICATIONS

Office Action dated Feb. 3, 2021, issued in corresponding Chinese Patent Application No. 201780036926.8.
Office Action dated Jul. 16, 2021, issued in corresponding Chinese Patent Application No. 201780036926.8.

* cited by examiner

AIR-COOLING BATTERY PACK HAVING IMPROVED ASSEMBLING STRUCTURE

TECHNICAL FIELD

The present application claims priority to Korean Patent Application No. 10-2016-0170653 filed on Dec. 14, 2016 in the Republic of Korea, the disclosures of which are incorporated herein by reference.

BACKGROUND ART

Generally, a battery pack includes a plurality of cells aggregated by serial and/or parallel connections. The battery pack typically includes a cell assembly having a plurality of cells arranged in one direction and a frame having a plate capable of surrounding the cell assembly.

In a conventional battery pack, if a cooling channel is separately designed in an air cooling type for cooling battery cells, the space occupied by the cooling channel is separately required. For this reason, it is difficult to simplify the structure and the capacity of cells to be mounted is limited.

In other words, the conventional battery pack is generally configured so that a cooling air is introduced through an inlet at one side of a housing accommodating a cell assembly, is moved through an air gap and then is discharged through a cooling fin to an outlet at the other side.

However, it is difficult to reduce the weight of the battery pack configured as above. Moreover, a large space is required for installing components in the battery pack, and the space utilization in the thickness direction of the cells is reduced, thereby reducing the capacity and lowering the cooling performance due to low thermal conductivity. In addition, since the air gap and the cooling fin are required, the cost increases.

In addition, in the conventional battery pack, as shown in FIG. 1, a circuit board plate 1 having an electrical component group mounted thereto is simply assembled at a top edge of a stacked cell structure of a cell assembly 2 by means of bolting (see the circle mark).

However, the assembling structure using a bolting process as shown in FIG. 1 has many processes since the bolting process is added, and also material costs are increased to raise a product price. In addition, there should be provided a space for coupling bolts 3 at regular intervals at circumferential edges of the circuit board plate 1, which results in a complicated configuration. For this reason, its technique alternative is demanded.

DISCLOSURE

Technical Problem

The present disclosure is designed to solve the problems of the related art, and therefore the present disclosure is directed to providing a battery pack having an improved assembling structure so that a circuit board plate may be attached to or detached from the battery pack without a bolting process.

The present disclosure is also directed to providing a battery pack, to which a circuit board plate may be mounted to improve the cooling performance by cooling cell edges with high thermal conductivity and to enhance the space utilization in the cell stacking direction.

Technical Solution

In one aspect of the present disclosure, there is provided an air-cooling battery pack, comprising: a cell assembly having a plurality of cells stacked therein; an air duct disposed to contact the cell assembly and having an air passage formed therein to allow a cooling air to move therethrough; a coupling groove formed at the air duct to elongate in a longitudinal direction; and a battery management system (BMS) plate having a BMS for managing the cells and assembled to the air duct by a slider slidably inserted into the coupling groove.

The slider may be respectively provided at both side edges of the BMS plate, and the coupling groove may be provided at the top of the air duct.

A guide rib elongating in a longitudinal direction may be formed at a top surface of the air duct to be integrated with the air duct, and the coupling groove may have a section with a '⊂' shape and be formed at the guide rib so that an opening thereof is oriented toward the inside of the battery pack.

The air duct may be made of aluminum material, and the slider may be made of plastic material and is inserted into the coupling groove.

Preferably, the slider may have a gradient structure with a gradually increasing thickness in a direction opposite to an inserting direction thereof.

The air-cooling battery pack according to the present disclosure may further comprise a fixing portion having a hole or groove form; and a stopper having a hook form and provided at a part of the BMS plate with plastic material, the stopper being coupled to the fixing portion in a state where the slider is completely inserted.

A truss structure may be provided inside the air duct.

Advantageous Effects

According to the present disclosure, the air-cooling battery pack gives the following effects.

First, since the BMS plate is completely assembled just by pushing the BMS plate into the battery pack, it is possible to reduce a process number and material costs in comparison to the conventional bolting assembling work.

Second, it is possible to stably support sliding of the BMS plate by using the air duct disposed in contact with the cell assembly.

Third, due to the truss structure provided in the air duct, it is possible to improve the cooling performance and reinforce the mechanical rigidity.

Fourth, since the gradient structure having a gradually increasing thickness in a direction opposite to the inserting direction of the slider is provided, the BMS plate may be tightly coupled to the air duct.

Fifth, the assembled state of the BMS plate may be firmly fixed by means of a hooking structure.

Sixth, since both side edges of the BMS plate are contacted and coupled to the air duct, the heat generated from the BMS plate may be effectively dissipated to the air duct.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
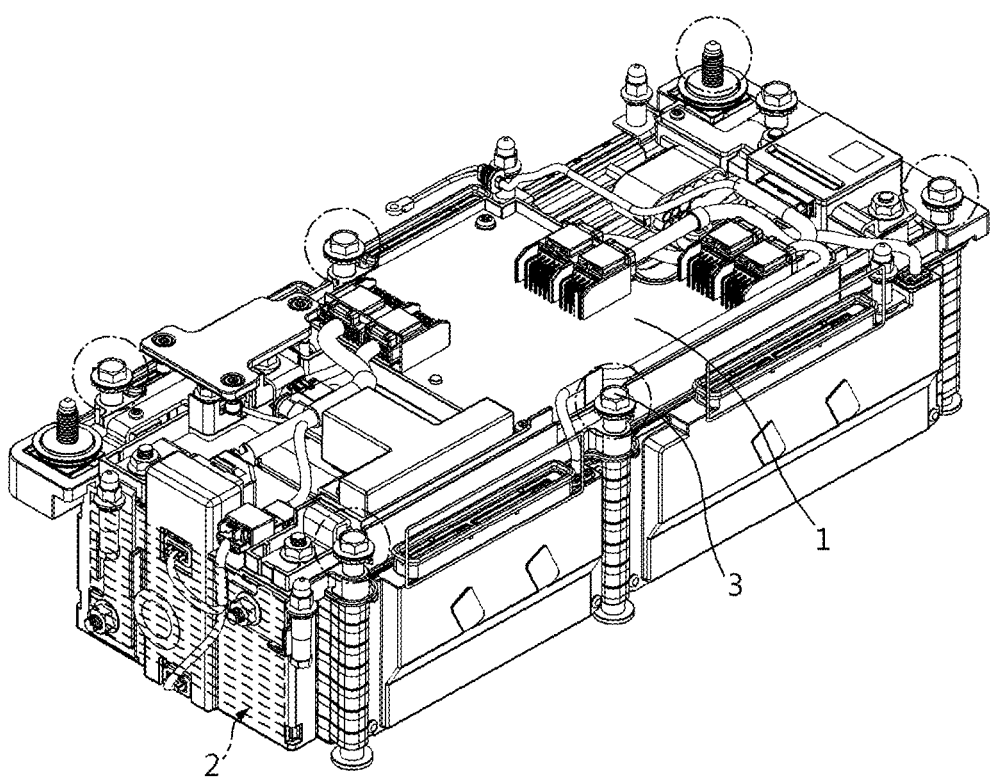
FIG. 1 is a perspective view showing a conventional battery pack.
Figure 2:
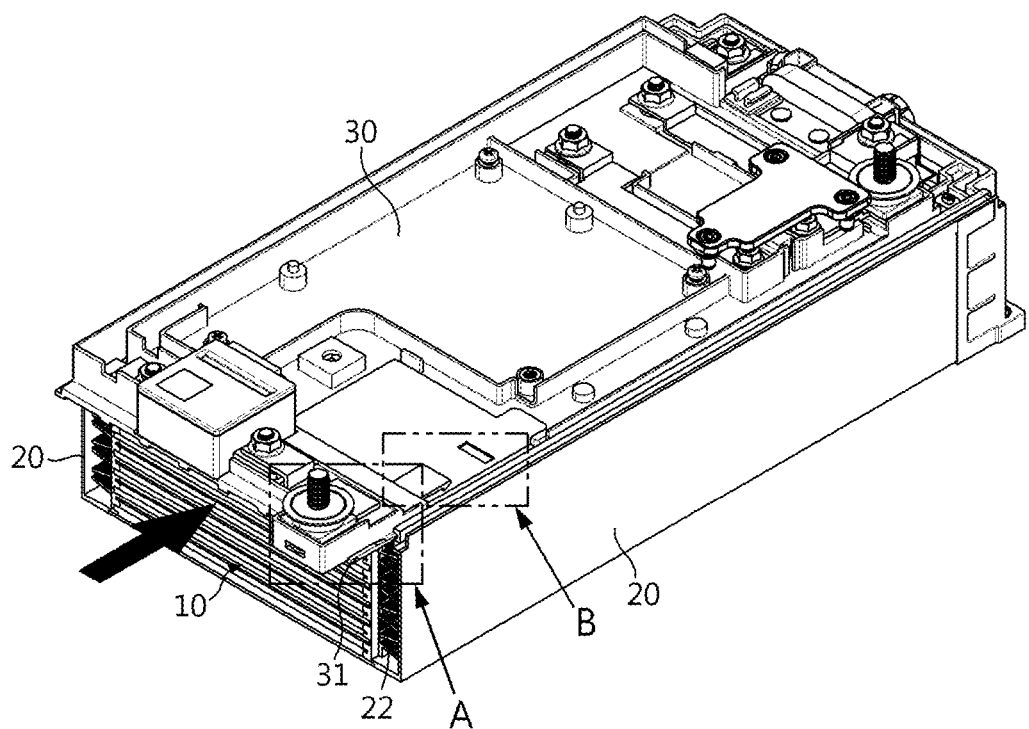
FIG. 2 is a perspective view showing an air-cooling battery pack according to an embodiment of the present disclosure.

FIG. 2 is a perspective view showing an air-cooling battery pack according to an embodiment of the present disclosure.

Referring to FIG. 2, a battery pack according to an embodiment of the present disclosure includes a cell assembly 10 having a plurality of cells, air ducts 20 disposed to contact both side edges of the cell assembly 10, and a BMS plate 30 detachably assembled to coupling grooves 22 formed at the top of the air ducts 20.

Each cell of the cell assembly 10 has a thin plate-like body and preferably has a pouch cell structure. The pouch cell includes a positive electrode, a separator and a negative electrode, which are alternately stacked so that an electrode tab is drawn out from at least one side thereof. The positive electrode and the negative electrode are fabricated by coating slurry containing an electrode active material, a binder resin, a conductive agent and other additives to at least one side of a current collector. In the case of a positive electrode, a common positive electrode active material such as a lithium-containing transition metal oxide may be used as the electrode active material. In the case of a negative electrode, a common negative electrode active material such as a lithium metal capable of intercalating and de-intercalating lithium ions, a carbonaceous material, a metal compound, or compounds thereof may be used as the electrode active material. In addition, the separator may adopt a common porous polymer film used in a lithium secondary battery.

A common electrolyte for a lithium secondary battery may be employed as the electrolyte contained in a pouch case together with the electrode assembly. The pouch case is formed of sheet material and has an accommodating portion for accommodating the electrode assembly. Preferably, the pouch case is formed by coupling a first case and a second case, which are prepared by processing a sheet material into a predetermined shape. The sheet material of the pouch case has a multi-layered structure including an outer resin layer provided at an outermost side and made of an insulating material such as polyethylene terephthalate (PET) or nylon, a metal layer made of an aluminum material to maintain mechanical strength and prevent penetration of moisture and oxygen, and an inner resin layer made of a polyolefin-based material and serving as a sealing material due to thermal adhesiveness.

In the sheet material of the pouch case, a predetermined adhesive resin layer may be interposed between the inner resin layer and the metal layer and between the outer resin layer and the metal layer, if necessary. The adhesive resin layer is intended for smooth attachment between different kinds of materials and is formed as a single layer or a multilayer. The adhesive material may be commonly made of a polyolefin resin, or a polyurethane resin for smooth processing, or a mixture thereof.

In the cell assembly 10, the plurality of cells are disposed at predetermined intervals in the thickness direction to form a substantially stacked structure.

The air duct 20 is for air-cooling the cell assembly 10 and includes a duct made of an aluminum material and having an air passage for moving a cooling air. An outer surface of the air duct 20 oriented toward the cell assembly 10 is disposed in contact with the edge portion of the cell assembly 10. At this time, it is preferable that a heat transfer material made of a thermal interface material (TIM) having high thermal conductivity is interposed between the edge portion of the cell assembly 10 and the air duct 20.

A truss structure 21 formed by repeatedly arranging frames to form a substantially triangular shape is provided inside the duct of the air duct 20 to improve the cooling performance and provide sufficient mechanical rigidity for protecting the cell assembly 10 from an external impact or the like.

In addition, a plurality of uneven patterns are formed on the surface of the truss structure 21 of the air duct 20. The uneven patterns improve the cooling performance by increasing the internal surface area of the air duct 20.

The air duct 20 is provided on both sides of the cell assembly 10, respectively, and is disposed so that the longitudinal direction thereof is extended identical to the longitudinal direction of the cell assembly 10.

A coupling groove 22 to which the BMS plate 30 may be assembled is provided at the top of the air duct 20. Preferably, the coupling groove 22 may be provided by a guide rib 23 formed at the top of the air duct 20. The guide rib 23 is formed integrally with the air duct 20 to extend in the longitudinal direction at the top surface of the air duct 20, and the coupling groove 22 is formed at the guide rib 23 such that the coupling groove 22 has a section of a '⊂' shape and its opening is oriented toward the inside of the battery pack.

The BMS plate 30 is a circuit board assembly to which a battery management system (BMS) for managing the cells and various electrical components required for the battery pack are mounted. The BMS plate 30 may be provided as a single plate or a plurality of plates assembled.

Figure 3:
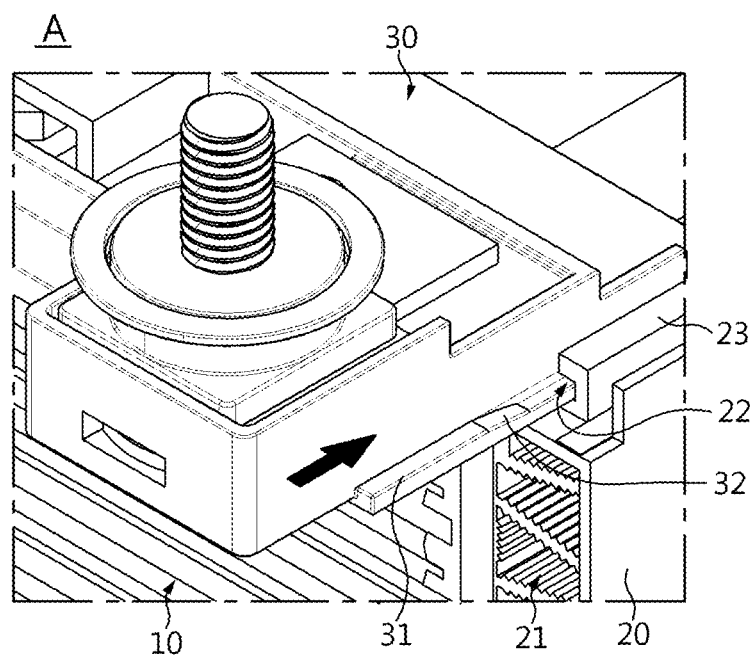
FIG. 3 is an enlarged perspective view showing a portion A of FIG. 2.
Figure 4:
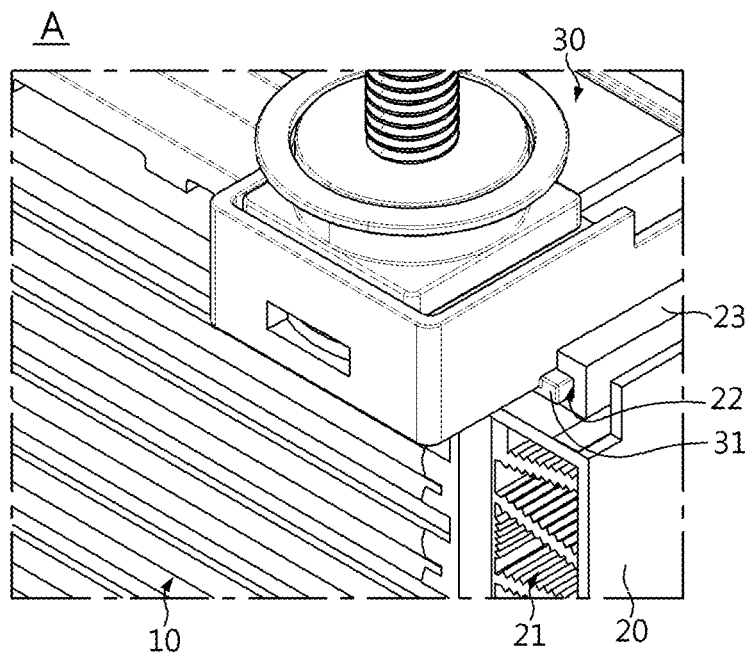
FIG. 4 is a perspective view showing a state where the slider of FIG. 3 is inserted a little further.
Figure 5:
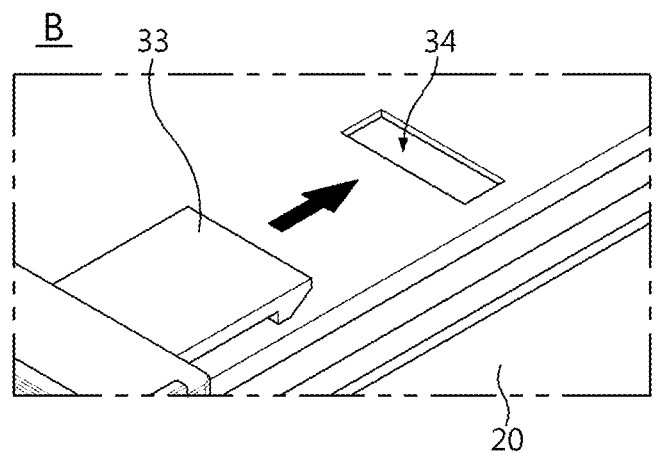
FIG. 5 is an enlarged perspective view showing a portion B of FIG. 2.
Figure 6:
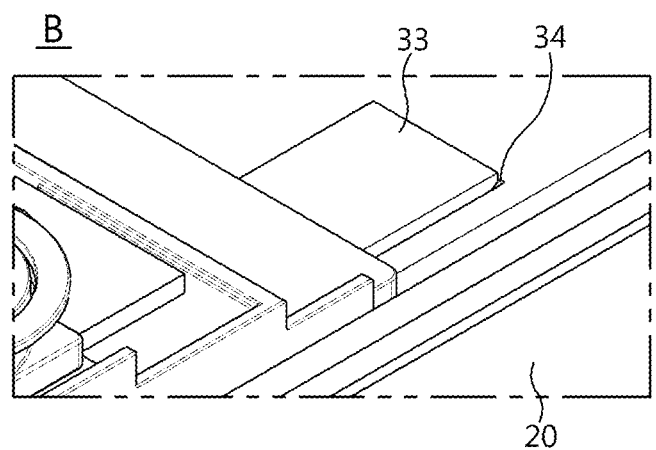
FIG. 6 is a perspective view showing a state where the stopper of FIG. 5 is hooked to the fixing portion.

The BMS plate 30 is disposed at an upper portion of the stacked structure of the cell assembly and both side edges of the BMS plate 30 are assembled by being slidably inserted into the coupling groove 22 of the air duct 20. For this, as shown in FIG. 3, a bar-type slider 31 shaped and sized to be inserted into the coupling groove 22 is formed at both side edges of the BMS plate 30 to extend in the longitudinal direction of the BMS plate 30.

The slider 31 is preferably integrally formed at the BMS plate 30 by plastic injection molding. A gradient structure 32 inclined to have a gradually increasing thickness in a direction opposite to the inserting direction is formed in a portion of the slider 31. The gradient structure 32 is for pressing the slider 31 into the coupling groove 22 and prevents the BMS plate 30 from being separated from the air duct 20 due to external vibration or impact or being damaged by shaking.

Since the guide rib 23 forming the coupling groove 22 is made of aluminum material integrally with the air duct 20, it is preferable that the slider 31 is made of plastic material and tightly inserted into the coupling groove 22. It is preferable that the gradient structure 32 is located close to a rear portion of the slider 31 so that the slider 31 is tightly fitted into the coupling groove 22 and simultaneously the BMS plate 30 is completely inserted.

In order to fix the position of the BMS plate 30 assembled in a sliding manner more firmly, a stopper 33 having a hook structure and made of plastic material is provided on a part of the BMS plate 30. The stopper 33 may be integrally formed when the BMS plate 30 is formed. In addition, a fixing plate 34 having a hole or groove form corresponding to the stopper 33 is provided at the air duct 20 or a predetermined support plate located under the BMS plate 30. When the slider 31 is completely inserted, the stopper 33 is hooked to the fixing portion 34 to effectively prevent movement of the BMS plate 30.

The battery pack configured as above according to an embodiment of the present disclosure is assembled by disposing the air ducts 20 at both side edges of the cell assembly 10 and then slidably coupling the BMS plate 30 to the air duct 20 at a location above the cell assembly 10.

The truss structure 21 is provided inside the air duct 20 to secure sufficient rigidity and increase the heat transfer area. In addition, due to the plurality of uneven patterns formed at the truss structure 21, the heat transfer area is further increased to improve the cooling performance.

The cooling air introduced into one opening of the air duct 20 moves along the air passage inside the air duct 20 and is forcibly discharged out at the opposite opening, during which, the cell assembly 1 is air-cooled.

In the assembling process of the BMS plate 30, a front end of the slider 31 provided at the edge of the BMS plate 30 is pushed and inserted into the coupling groove 22 of the guide rib 23 integrated at the top of the air duct 20 so that the plate 30 is disposed at the upper portion of the cell assembly 10.

Immediately before the BMS plate 30 is completely inserted into the air duct 20, the BMS plate 30 is gradually inserted more tightly due to the gradient structure 32 of the slider 31, and finally the stopper 33 is hooked to the fixing portion 34 to fix the assembled state.

By means of the structure in which both side edges of the BMS plate 30 are coupled in contact with the air duct 20, the heat generated from the BMS plate 30 may be efficiently conducted to the air duct 20 and cooled.

The battery pack according to the present disclosure may simplify the assembling process and reduce the material cost since the bolting process may be omitted when the BMS plate 30 is coupled, compared to the conventional battery pack.

In addition, since the battery pack is cooled by the air ducts 20 disposed at both sides of the cell assembly, the space utilization in the cell thickness direction may be enhanced. Also, by means of the truss structure 21 provided inside the air duct 20, it is possible to sufficiently secure the mechanical stiffness and improve the cooling performance.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

If the present disclosure is applied, the assembling work for inserting the BMS plate into the battery pack is improved, thereby reducing a process number and material costs, compared to the conventional bolting assembling work.

What is claimed is:

1. An air-cooling battery pack, comprising:
   a cell assembly having a plurality of cells stacked therein, the plurality of cells being pouch-type battery cells stacked against each other in a thickness direction;
   an air duct disposed to contact the cell assembly along the entire thickness of the stack, the air duct having an air passage formed therein, the air passage being configured to allow a cooling air to move therethrough in a longitudinal direction perpendicular to the thickness direction;
   a coupling groove formed at the air duct to elongate in the longitudinal direction; and
   a battery management system (BMS) plate having a BMS for managing the cells and assembled to the air duct by a slider slidably inserted into the coupling groove,
   wherein the air duct is respectively disposed at both side edges of the cell assembly.

2. The air-cooling battery pack according to claim 1, wherein:
   the slider is respectively provided at both side edges of the BMS plate; and
   the coupling groove is provided at the top of the air duct.

3. The air-cooling battery pack according to claim 2, wherein:
   a guide rib elongating in the longitudinal direction is formed at a top surface of the air duct to be integrated with the air duct; and
   the coupling groove has a section with a '⊂' shape and is formed at the guide rib so that an opening thereof is oriented toward the inside of the battery pack.

4. The air-cooling battery pack according to claim 3, wherein the slider has a gradient structure with a gradually increasing thickness in a direction opposite to an inserting direction thereof.

5. The air-cooling battery pack according to claim 4, wherein:
   the air duct is made of aluminum material; and
   the slider is made of plastic material and is inserted into the coupling groove.

6. The air-cooling battery pack according to claim 5, further comprising:
   a fixing portion having a hole or groove form; and
   a stopper having a hook form and provided at a part of the BMS plate with plastic material, the stopper being coupled to the fixing portion in a state where the slider is completely inserted.

7. The air-cooling battery pack according to claim 2, wherein a truss structure is provided inside the air duct.

8. An air-cooling battery pack, comprising:
   a cell assembly including a plurality of cells stacked therein, the plurality of cells being pouch-type battery cells stacked against each other in a thickness direction;
   an air duct in contact with an edge side of the cell assembly along the entire thickness of the stack, the air duct defining an air passage in a longitudinal direction, perpendicular to the thickness direction, to allow a cooling air to move therethrough;
   a coupling groove defined at a top of the air duct and extending in the longitudinal direction; and
   a battery management system (BMS) plate having a BMS to manage the cells and attached to the air duct by a slider slidably inserted into the coupling groove,
   wherein the air duct is respectively disposed at both side edges of the cell assembly.

9. The air-cooling battery pack according to claim 8, wherein:
   the slider is respectively provided at both side edges of the BMS plate;
   the coupling groove is provided at both sides at the top of the air duct; and the slider is slidably inserted into the coupling groove at both sides of the air duct.

10. The air-cooling battery pack according to claim 8, wherein:
   a guide rib elongated in the longitudinal direction is formed at a top surface of the air duct to be integrated with the air duct; and
   the coupling groove has a cross-sectional with a '⊂' shape and is formed at the guide rib so that an opening thereof is oriented toward the inside of the battery pack.

11. The air-cooling battery pack according to claim 8, wherein the slider has an inclined upper surface structure such that the slider has a gradually increasing thickness in a direction opposite to an inserting direction thereof.

12. The air-cooling battery pack according to claim 8, wherein:
   the air duct is made of aluminum; and
   the slider is made of plastic.

13. The air-cooling battery pack according to claim 12, further comprising:
   a fixing portion having a hole or groove form; and
   a stopper having a hook form, the stopper being provided at a part of the BMS plate made of plastic, the stopper being coupled to the fixing portion in a state in which the slider is completely inserted into the coupling groove.

14. The air-cooling battery pack according to claim 8, wherein a truss structure is inside the air duct.

15. The air-cooling battery pack according to claim 7, wherein a plurality of uneven patterns are on a surface of the truss structure.

16. The air-cooling battery pack according to claim 14, wherein a plurality of uneven patterns are on a surface of the truss structure.

\* \* \* \* \*